United States Patent
Cummings et al.

(10) Patent No.: US 8,712,627 B2
(45) Date of Patent: Apr. 29, 2014

(54) BIODIESEL DATA COLLECTION SYSTEM

(75) Inventors: Jill M. Cummings, Byron, MI (US); Mike M. McDonald, Macomb, MI (US); William C. Albertson, Clinton Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 602 days.

(21) Appl. No.: 12/556,403

(22) Filed: Sep. 9, 2009

(65) Prior Publication Data

US 2011/0060497 A1   Mar. 10, 2011

(51) Int. Cl.
    *G06F 17/00*     (2006.01)
    *G06F 19/00*     (2011.01)
    *G08G 1/123*     (2006.01)
    *G01M 17/00*     (2006.01)

(52) U.S. Cl.
    USPC ....... 701/29.1; 701/31.4; 701/33.4; 701/33.8; 340/995.14; 340/995.27

(58) Field of Classification Search
    USPC ................ 701/1, 29.1, 31.4, 31.5, 31.6, 32.3, 701/32.4, 32.5, 33.4, 33.6, 33.9, 34.2, 34.4, 701/400, 408, 409, 33.8; 340/988, 989, 340/995.14, 995.27
See application file for complete search history.

(56) References Cited

U.S. PATENT DOCUMENTS

| | | | |
|---|---|---|---|
| 2009/0061573 A1 | 3/2009 | Miyairi et al. | |
| 2011/0000579 A1* | 1/2011 | Allinson et al. | 141/9 |
| 2011/0208409 A1* | 8/2011 | Snyder et al. | 701/109 |
| 2011/0233233 A1* | 9/2011 | Winsness | 222/145.6 |

FOREIGN PATENT DOCUMENTS

CN      1873722 A    12/2006

OTHER PUBLICATIONS

"Excess biodiesel fuel concentration warning subsystem," disclosed anonymously, Research Disclosure Journal, ISSN 0374-4353, Jan. 2009, 2 pgs.

* cited by examiner

*Primary Examiner* — Thomas Tarcza
*Assistant Examiner* — Edward Pipala
(74) *Attorney, Agent, or Firm* — Harness, Dickey & Pierce, P.L.C.

(57) ABSTRACT

A vehicle biodiesel fuel diagnostic method may include determining a biodiesel fuel concentration of fuel added to a vehicle fuel tank during a fueling event at a fueling location and determining the fueling location. The biodiesel fuel concentration and fueling location may be transmitted to an information system where the concentration and location are stored in a database. The method may further include indicating an abnormal biodiesel fuel condition in the database when the biodiesel fuel concentration is outside of a predetermined range.

20 Claims, 4 Drawing Sheets

BIODIESEL DATA COLLECTION SYSTEM

FIELD

The present disclosure relates to methods and systems for evaluation of a biodiesel fuel concentration.

BACKGROUND

This section provides background information related to the present disclosure which is not necessarily prior art.

Diesel engines may be operated using a mixture of petroleum diesel and biodiesel fuel. When the mixture is outside of a predetermined range, vehicle performance issues such as engine malfunction and emission control system damage may occur. These malfunctions may be due to reasons outside of the control of the vehicle manufacturer, and therefore not protected by the manufacturer's warranty which outlines the specific guidelines for biodiesel use per design. However, it may be difficult to discern whether the performance issues are caused by abnormal fuel. This may result in the manufacturer paying for a warranty claim when the manufacturer is not actually liable.

SUMMARY

A vehicle biodiesel fuel diagnostic method may include determining a biodiesel fuel concentration of fuel added to a vehicle fuel tank during a fueling event at a fueling location and determining the fueling location. The biodiesel fuel concentration and fueling location may be transmitted to an information system where the concentration and location are stored in a database. The method may further include indicating an abnormal biodiesel fuel condition in the database when the biodiesel fuel concentration is outside of a predetermined range.

A vehicle fuel diagnostic system may include a control module and a transmitter. The control module may determine a biodiesel fuel concentration of fuel added to a vehicle fuel tank during a fueling event at a fueling location. The transmitter may selectively transmit the determined biodiesel fuel concentration and fueling location to an information system where the concentration and location are stored.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Figure 1:
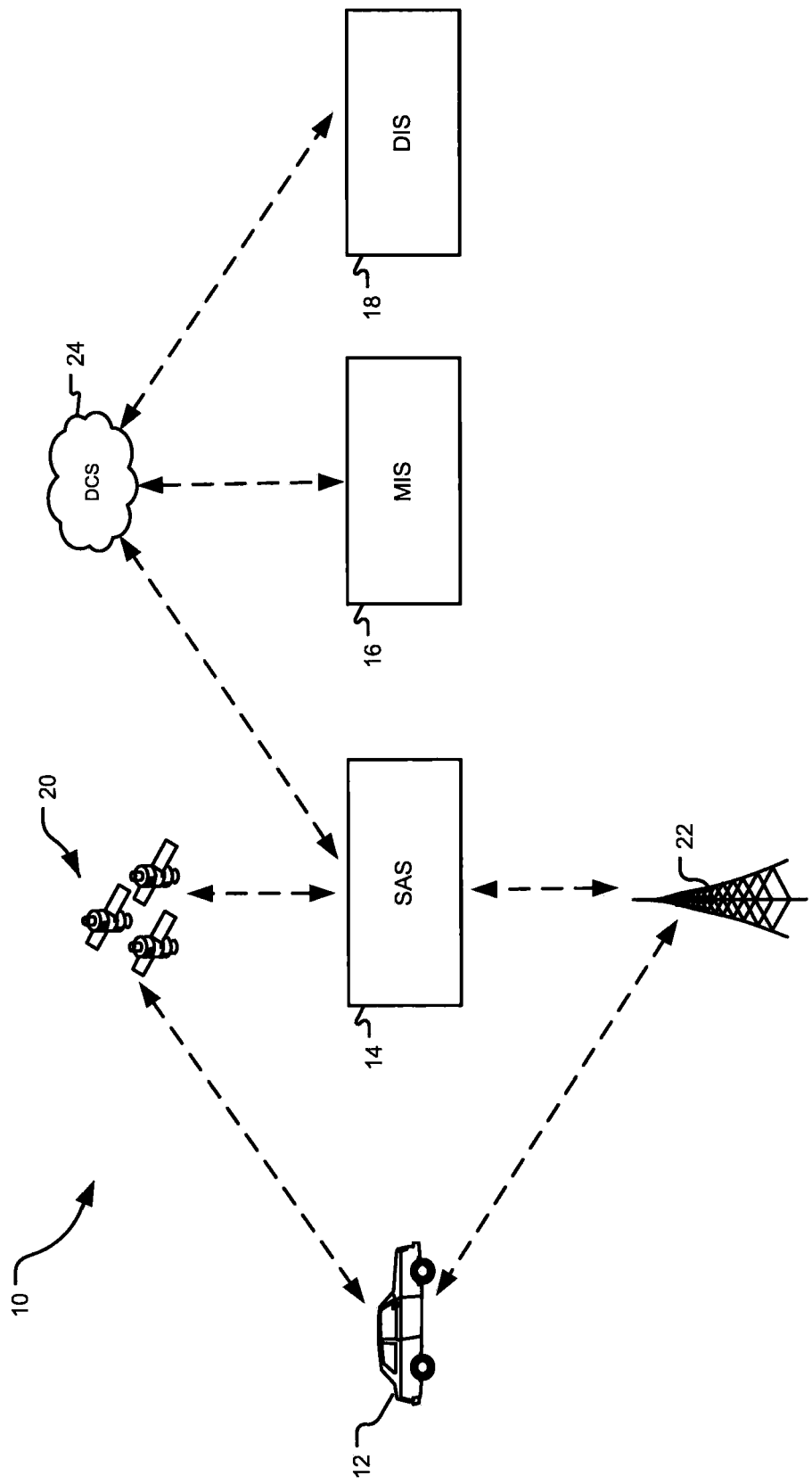
FIG. 1 is a schematic illustration of a vehicle diagnostic system according to the present disclosure.

Examples of the present disclosure will now be described more fully with reference to the accompanying drawings. The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle fuel diagnostic system 10 is schematically illustrated. The vehicle fuel diagnostic system 10 may include a vehicle 12, a service assistance system (SAS) 14, a manufacturer information system (MIS) 16, a dealer information system (DIS) 18, a satellite link 20, a terrestrial link 22, and a distributed communication system (DCS) 24. Information may be transmitted between the vehicle 12 and the service assistance system 14 via the satellite link 20 and/or the terrestrial link 22. By way of non-limiting example, the service assistance system 14 may include OnStar® by General Motors. The satellite link 20 may include satellites forming a global positioning (GPS) system. The terrestrial link 22 may include, but is not limited to, a cellular wireless network. The distributed communication system 24 may include a wide area network (WAN), the Internet, a connection over a public switch telephone network, and/or other networks.

Figure 2:
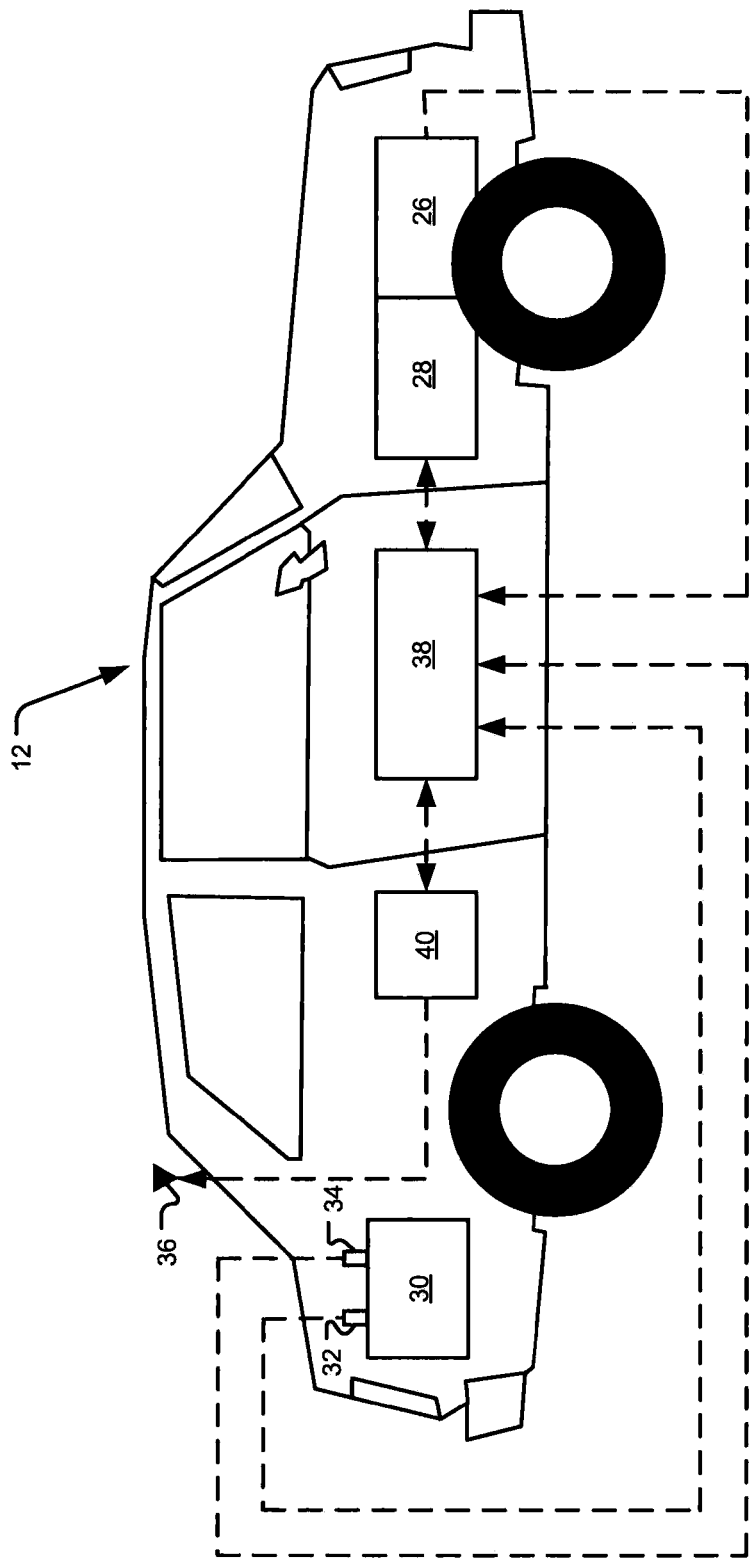
FIG. 2 is a schematic illustration of the vehicle shown in FIG. 1.

As seen in FIG. 2, the vehicle 12 may include an engine 26, a transmission 28, a fuel tank 30, a fuel level sensor 32, a biodiesel sensor 34, an antenna 36, a control module 38 and a remote service assistance system 40. The control module 38 may be in communication with the engine 26, the transmission 28, the fuel level sensor 32, the biodiesel sensor 34 and the remote service assistance system 40. The control module 38 may determine the volume of fuel in the fuel tank 30 based on the signal provided by the fuel level sensor 32. The engine 26 may be a diesel engine and may operate by combusting fuel from the fuel tank 30. The fuel tank 30 may contain a mixture of petroleum diesel and biodiesel fuel. The control module 38 may determine the biodiesel fuel concentration within the fuel tank 30 using a signal provided by the biodiesel sensor 34.

Figure 3:
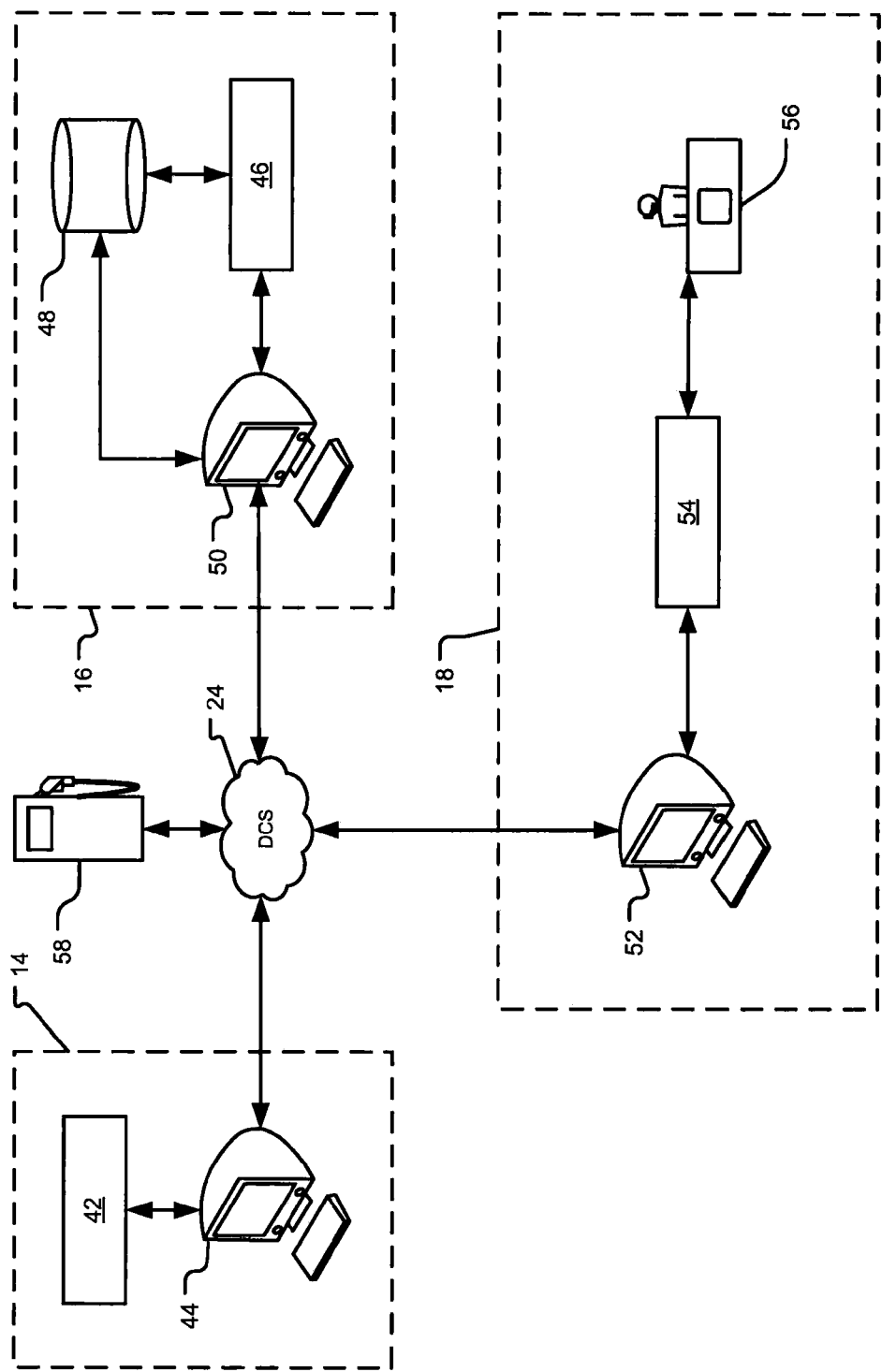
FIG. 3 is an additional schematic illustration of the diagnostic system shown in FIG. 1.

With reference to FIG. 3, the service assistance system 14 may include a receiver 42 and a server 44. The receiver 42 may receive vehicle information via the satellite link 20 and/or the terrestrial link 22. The receiver 42 may provide the vehicle information to the server 44. The server 44 may route the information to the manufacturer information system 16 via the distributed communication system 24. The manufacturer information system 16 may include a biodiesel evaluation module 46, a database 48 and a server 50. The dealer information system 18 may include a server 52, a vehicle service module 54 and dealership personnel 56.

Figure 4:
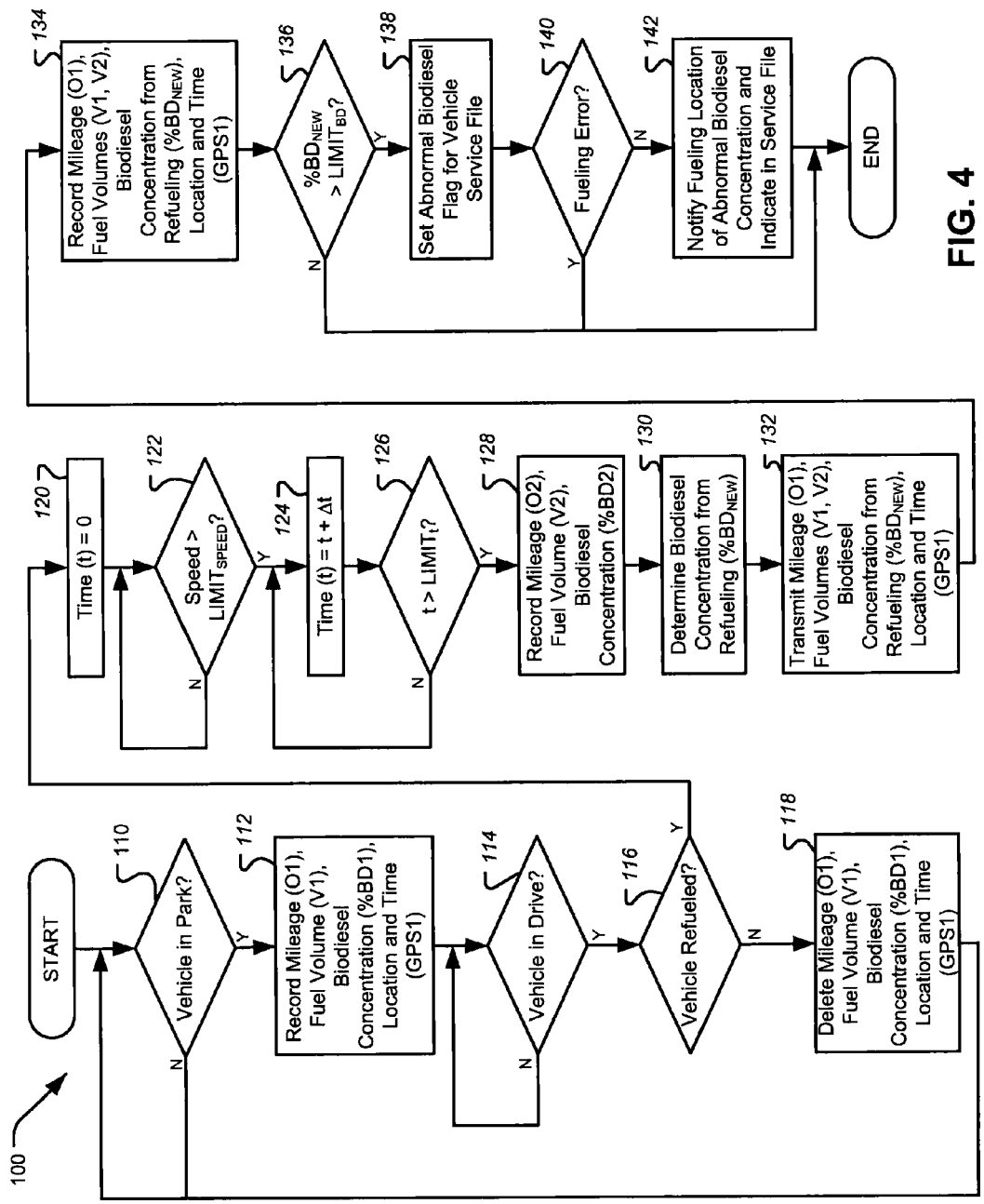
FIG. 4 is a flow chart illustrating steps for the vehicle diagnostic system.

With additional reference to FIG. 4, exemplary operation of the vehicle fuel diagnostic system 10 is illustrated by control logic 100. Control logic 100 may begin at step 110 where control logic 100 determines if the vehicle 12 is in park. If the vehicle 12 is not in park, control logic 100 returns to step 110. If the vehicle 12 is in park, control logic 100 proceeds to step 112 where the current vehicle mileage (O1), fuel volume (V1), biodiesel concentration (% BD1), and the location and time (GPS1) are recorded by the control module 38. The location may generally correspond to the fueling location 58 (FIG. 3). Control logic 100 may then proceed to step 114 where control logic 100 determines if the vehicle 12 is in drive. If the vehicle 12 is not in drive, control logic 100 returns to step 114. If the vehicle 12 is in drive, control logic 100 proceeds to step 116 where the control module 38 evaluates whether the vehicle 12 has been refueled.

If the vehicle 12 has not been refueled, the current vehicle mileage (O1), fuel volume (V1), biodiesel concentration (% BD1), and the location and time (GPS1) are deleted from the control module 38. Control logic 100 then returns to step 110. If the vehicle 12 has been refueled, control logic 100 proceeds to step 120. A time counter resets accumulated time (t) to zero (t=0) at step 120. Control logic 100 then proceeds to step 122 where vehicle speed is evaluated. If the vehicle speed is greater than a predetermined limit ($LIMIT_{SPEED}$), control logic 100 proceeds to step 124 where the accumulated time (t) is incremented. Control logic 100 then proceeds to step 126 where the accumulated time (t) is compared to a predetermined limit ($LIMIT_t$). If the accumulated time (t) is greater than $LIMIT_t$, control logic 100 proceeds to step 128. Otherwise, control logic 100 returns to step 124. The vehicle speed being greater than the predetermined limit ($LIMIT_{SPEED}$) for at least the predetermined time ($LIMIT_t$) provides for mixing of the fuel from refueling with the fuel previously in the fuel tank 30. Once adequate mixing has occurred, as determined by steps 122-126, control logic proceeds to step 128.

At step 128, the control module 38 may again record the current vehicle mileage (O2), fuel volume (V2) and biodiesel concentration (% BD2). The biodiesel concentration (% $BD_{NEW}$) of the fuel from the refuel may then be determined at step 130. The % $BD_{NEW}$ may be determined based on % BD1, % BD2, V1 and V2. The following functions illustrate a non-limiting example of the calculation of % $BD_{NEW}$:

$$V1_{BD}=(\% BD1)(V1);$$

$$V2_{BD}=(\% BD2)(V2);$$

$$V_{BD\_NEW}=V2_{BD}-V1_{BD};$$

$$V_{NEW}=V2-V1;$$

$$\% BD_{NEW}=V_{BD\_NEW}/V_{NEW};$$

where $V1_{BD}$ is the biodiesel fuel volume contained in V1, $V2_{BD}$ is the biodiesel fuel volume contained in V2, $V_{BD\_NEW}$ is the biodiesel fuel volume from refueling, and $V_{NEW}$ is the total fuel volume from refueling. The % $BD_{NEW}$ may then be transmitted to the manufacturer information system 16 at step 132, where the mileage (O1), fuel volumes (V1, V2), and location and time (GPS1) are also transmitted to the manufacturer information system 16. The manufacturer information system 16 may store % $BD_{NEW}$, O1, V1, V2 and GPS1 in the database 48.

Control logic 100 may then proceed to step 136 where the biodiesel evaluation module 46 evaluates % $BD_{NEW}$ relative to a predetermined limit ($LIMIT_{BD}$). By way of non-limiting example, $LIMIT_{BD}$ may include a biodiesel concentration of at least twenty percent by volume. If % $BD_{NEW}$ is outside of a predetermined range (i.e., greater than $LIMIT_{BD}$), control logic 100 proceeds to step 138 where a flag is set in the vehicle service file in the database 48, indicating use of abnormal diesel fuel. Otherwise, control logic 100 may terminate. After step 138, control logic 100 may proceed to step 140 where the cause of the abnormal biodiesel concentration is evaluated. Step 140 may evaluate whether the abnormal biodiesel concentration is due to the selection of an improper grade of fuel by the user or whether the fueling location has fuel with the abnormal biodiesel concentration.

The cause of the abnormal biodiesel concentration may be evaluated in a variety of ways. In a first non-limiting example, the database 48 may be evaluated to determine if similar abnormal biodiesel concentrations have occurred at the same location within a predetermined time window. If similar instances have occurred, control logic 100 may proceed to step 142 where the fueling location is notified of the abnormal biodiesel condition and the vehicle service file is updated to attribute the abnormal biodiesel concentration to the fueling location. Otherwise, the vehicle service file may indicate that the cause of the abnormal biodiesel concentration is undeterminable or due to user error (i.e., selecting improper fuel grade).

The service file provides for prevention of warranty claims by a vehicle owner when the vehicle failure mode is attributed to abnormal biodiesel fuel rather than any manufacturer component failure. By way of non-limiting example, if a user is experiencing engine malfunction and the vehicle is brought in for service, the dealer information system 18 may access the service file in the database 48. The diagnostic code related to the engine malfunction may be evaluated relative to any flags set in the service file of the vehicle. The time of an abnormal biodiesel flag may be compared to the time of the diagnostic code indicating engine trouble. If the diagnostic code was set within a predetermined time after the abnormal biodiesel flag, the engine malfunction may be attributed to abnormal biodiesel fuel and liability for a warranty claim may be avoided. The user may be referred to the fueling location for the warranty claim or the manufacturer may recover the cost of the claim from the fueling location when the abnormal biodiesel fuel condition is attributable to the fueling location. If the abnormal biodiesel fuel condition is attributable to the user (i.e., selecting improper fuel grade), the warranty claim may be denied.

What is claimed is:

1. A vehicle biodiesel fuel diagnostic method comprising:
   determining a biodiesel fuel concentration of fuel added to a vehicle fuel tank during a fueling event at a fueling location using a control module;
   determining the fueling location;
   the control module using a transmitter to transmit the biodiesel fuel concentration and fueling location to a server of an information system where the concentration and location are stored in a database; and
   indicating an abnormal biodiesel fuel condition in the database when the biodiesel fuel concentration is outside of a predetermined range.

2. The method of claim 1, further comprising notifying the fueling location of the abnormal biodiesel fuel condition.

3. The method of claim 1, further comprising determining a fueling time corresponding to the fueling event and transmitting the fueling time to the information system where the fueling time is stored in the database.

4. The method of claim 3, further comprising referencing the database when a warranty claim is attempted for the vehicle and determining whether the warranty claim is related to an abnormal fuel condition.

5. The method of claim 4, further comprising denying the warranty claim when the claim is due to the abnormal fuel condition.

6. The method of claim 4, further comprising evaluating the database and determining whether additional abnormal fuel conditions have occurred at the fueling location within a predetermined time window.

7. The method of claim 6, further comprising updating the database to indicate that the abnormal fuel condition is attributable to the fueling location when additional abnormal fuel conditions have occurred at the fueling location within the predetermined time window.

8. The method of claim 6, further comprising updating the database to indicate that the abnormal fuel condition is attributable to improper fuel selection when no additional abnormal fuel conditions have occurred at the fueling location within the predetermined time window.

9. The method of claim 1, wherein the biodiesel fuel concentration of fuel added to the vehicle fuel tank is determined by evaluating an initial volume of fuel (V1) and an initial biodiesel concentration (% BD1) in the fuel tank before the fueling event and a final volume of fuel (V2) and a final biodiesel concentration (% BD2) in the fuel tank after the fueling event.

10. The method of claim 1, wherein the determining the fueling location includes a global positioning system determining the fueling location.

11. A vehicle fuel diagnostic system comprising:
a control module that determines a biodiesel fuel concentration of fuel added to a vehicle fuel tank during a fueling event at a fueling location; and
a transmitter that selectively transmits the determined biodiesel fuel concentration and fueling location to an information system where the concentration and location are stored.

12. The vehicle fuel diagnostic system of claim 11, wherein the information system includes a manufacturer information system that is remote from the vehicle, that wirelessly receives the determined biodiesel fuel concentration, that stores the determined biodiesel fuel concentration and location of the fueling event in a database, that determines when an abnormal biodiesel fuel condition occurs and that indicates the abnormal biodiesel fuel condition in the database.

13. The vehicle fuel diagnostic system of claim 12, wherein the manufacturer information system transmits the abnormal biodiesel fuel condition to the fueling location.

14. The vehicle fuel diagnostic system of claim 12, wherein the manufacturer information system determines the time of the fueling event.

15. The vehicle fuel diagnostic system of claim 14, further comprising a global positioning system that determines the fueling location.

16. The vehicle fuel diagnostic system of claim 14, further comprising a dealer information system that accesses the database when a warranty claim is attempted for the vehicle and that determines whether the warranty claim is related to an abnormal fuel condition.

17. The vehicle fuel diagnostic system of claim 16, wherein the manufacturer information system evaluates the database and determines whether additional abnormal fuel conditions have occurred at the fueling location within a predetermined time window.

18. The vehicle fuel diagnostic system of claim 17, wherein the manufacturer information system updates the database to indicate that the abnormal fuel condition is attributable to the fueling location when additional abnormal fuel conditions have occurred at the fueling location within the predetermined time window.

19. The vehicle fuel diagnostic system of claim 17, wherein the manufacturer information system updates the database to indicate that the abnormal fuel condition is attributable to improper fuel selection when no additional abnormal fuel conditions have occurred at the fueling location within the predetermined time window.

20. The vehicle fuel diagnostic system of claim 11, wherein the biodiesel concentration of the fuel added to the vehicle fuel tank is determined by evaluating an initial volume of fuel (V1) and an initial biodiesel concentration (% BD1) in the fuel tank before the fueling event and a final volume of fuel (V2) and a final biodiesel concentration (% BD2) in the fuel tank after the fueling event.

* * * * *